(12) United States Patent
Nakayama et al.

(10) Patent No.: US 7,360,824 B2
(45) Date of Patent: Apr. 22, 2008

(54) OPERATOR CAB FOR CONSTRUCTION MACHINE

(75) Inventors: Shinichi Nakayama, Nagano (JP); Mitsuhisa Shinsen, Ishikawa (JP)

(73) Assignees: Takeuchi Mfg. Co., Ltd., Nagano (JP); Kyowa Sangyo Co., Ltd., Ishikawa (JP)

( * ) Notice: Subject to any disclaimer, the term of this patent is extended or adjusted under 35 U.S.C. 154(b) by 268 days.

(21) Appl. No.: 11/114,171

(22) Filed: Apr. 26, 2005

(65) Prior Publication Data
US 2005/0241866 A1 Nov. 3, 2005

(30) Foreign Application Priority Data
Apr. 30, 2004 (JP) .............................. 2004-135879

(51) Int. Cl.
*B60J 5/04* (2006.01)

(52) U.S. Cl. .................................. 296/190.11; 296/155

(58) Field of Classification Search ........... 296/190.11, 296/155, 146.12
See application file for complete search history.

(56) References Cited

U.S. PATENT DOCUMENTS

| | | | |
|---|---|---|---|
| 5,577,795 A | 11/1996 | Shinsen | |
| 6,793,268 B1 * | 9/2004 | Faubert et al. | 296/146.12 |
| 7,040,687 B2 * | 5/2006 | Ishibashi et al. | 296/146.12 |
| 2004/0041410 A1 | 3/2004 | Ishibashi et al. | |

FOREIGN PATENT DOCUMENTS

| | | |
|---|---|---|
| JP | 04353129 | 8/1992 |
| JP | 04-353129 | 12/1992 |
| JP | 08312220 | 11/1996 |
| JP | 2000054433 | 2/2000 |
| JP | 2001107391 | 4/2001 |
| JP | 2001113946 | 4/2001 |
| JP | 2004042704 | 2/2004 |
| JP | 2004044217 | 2/2004 |

* cited by examiner

*Primary Examiner*—Joseph D Pape
(74) *Attorney, Agent, or Firm*—Donald R. Studebaker; Nixon Peabody LLP (57) ABSTRACT

An operator cab 53, which is mounted rotatable on the vehicle body 51 of a hydraulic mini-shovel 50, comprises a cab box 1, a door 2, upper and lower link members 3 and 4, a slide member 6, a closed door stopper 12 and an opened door stopper 11. The cab box 1 has an internal cab room 1*a* and an entrance 15, which leads into the cab room 1*a*. The door 2 closes and opens the entrance 15 when it is moved forward and rearward, respectively. The upper and lower link members 3 and 4 have fixed ends 3*a* and 4*a*, each of which is connected pivotally to the cab box 1, and moving ends 3*b* and 4*b*, each of which is connected pivotally to the front end of the door 2. The slide member 6 comprises a bumper 6*a*, which is provided at the rear end of the door 2, and a rocker 6*b*, which is connected pivotally to the bumper 6*a* so as to swing freely and slides along a slide rail 5, which is provided externally on the cab box 1. The closed door stopper 12 is provided in front of the slide rail 5 while the opened door stopper 11 is provided in rear of the slide rail 5. When the door 2 is closed, the bumper 6*a* fits with the closed door stopper 12 to fix the rear end of the door 2. On the other hand, when the door 2 is opened, the bumper 6*a* fits with the opened door stopper 11 to fix the rear end of the door 2.

9 Claims, 13 Drawing Sheets

OPERATOR CAB FOR CONSTRUCTION MACHINE

FIELD OF THE INVENTION

The present invention relates generally to an operator cab used for a construction machine and particularly to an operator cab for a construction machine which has an entrance door.

BACKGROUND OF THE INVENTION

Figure 10:
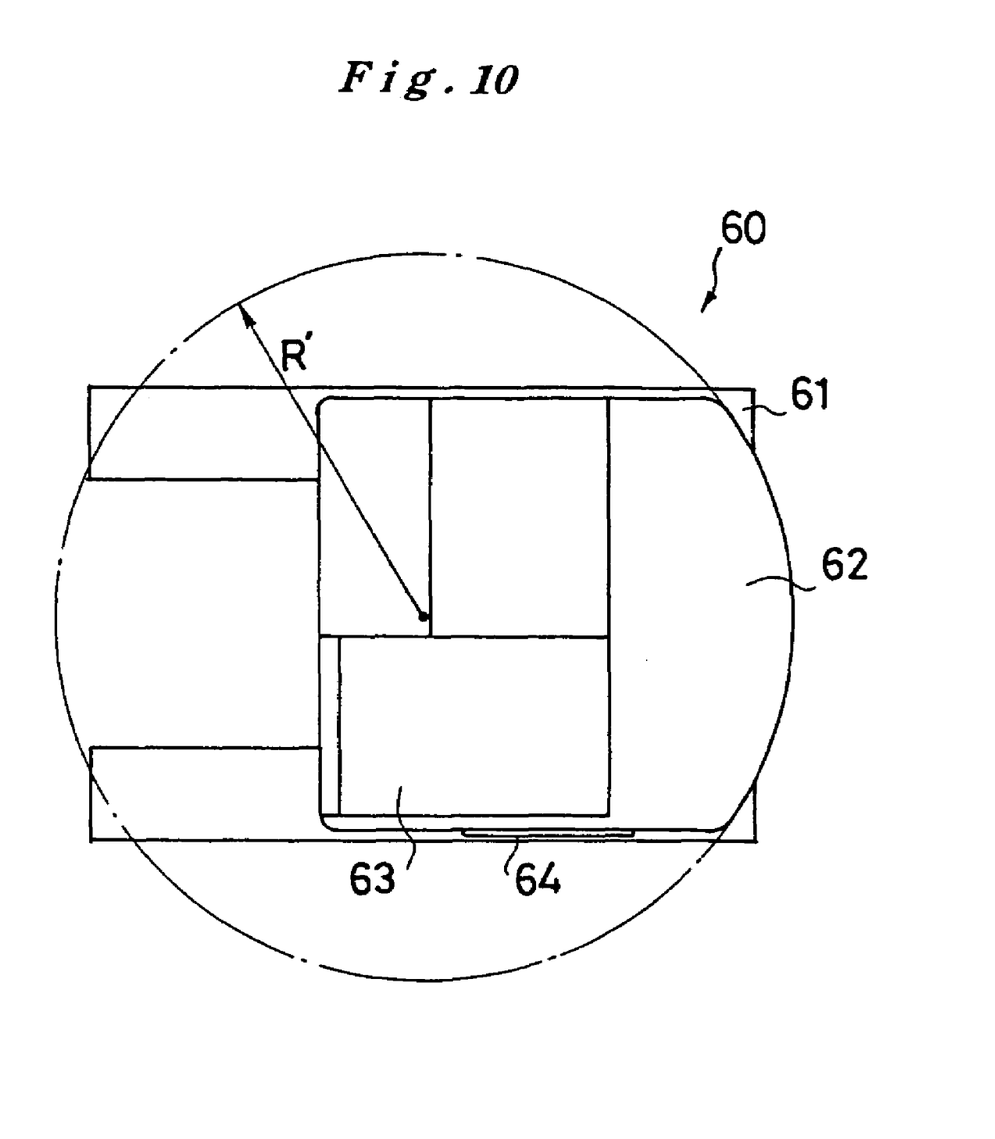
FIG. 10 is a plan view of a prior-art, large construction machine.

Construction equipment such as a hydraulic mini-shovel comprises an operator cab and a construction machine, which are provided on a vehicle body, so that they are easily turned around for performing construction work. While work is being performed, the door of the operator cab, through which an operator gets into or out of the cab, is usually closed, but it is sometimes kept open. FIG. 10 shows a large construction machine 60. It comprises a turret 62, which is provided rotatable on a vehicle body 61, and an operator cab 63, which is mounted on the turret 62. In a case like this large construction machine 60, the turning radius R' of the turret 62 is relatively large, so the door 64 of the cab 63 never exceeds the turning radius R' even in its opened condition. However, in a case of a small construction machine, as the turning radius is accordingly small, there is a probability that the door in its opened condition exceed the turning radius. To solve this problem, there is known an operator cab for a construction machine, the door of which cab is designed not to exceed the turning radius even in its opened condition (for example, refer to Japanese Laid-Open Patent Publication No. H04(1992)-353129). In this operator cab, the door slides back and forth along a rail and along the outer periphery of the cab in a top view, and the side of the cab that includes the door is curved convex in a top view, so that the door in its opened condition never exceeds the turning radius of the cab.

Problems to be Solved by the Invention

In a case where the door slides back and forth along a rail, a handle used to open or close the door is provided on a side toward which the door closes (this side is referred to as "front side") while a lock to maintain the opened and closed conditions of the door is provided on a side toward which the door opens (this side is referred to as "rear side"). To support this design, at the central part of the door, a mechanism is provided to connect the handle and the lock and to engage or disengage the lock to or from a striker. Because of such a complicated design of the door, there are following problems. The door is thick and heavy, so the manufacturing cost of the door is relatively high. Also, because of the mechanism placed at the central part of the door, a window is not available for outside view on the door. Furthermore, as for operability in opening and shutting the door, rollers and a slide rail constituting a slide mechanism present rough movements for the opening and closing of the door. The door just before its complete closure rubs the cab on the front side and moves along the lateral face of the cab on the rear side. This makes not only the feel of the door operation awkward but also makes the seal of the door malfunction, causing leakage.

SUMMARY OF THE INVENTION

It is an object of the present invention to provide an operator cab for a construction machine which cab has a door to be opened and closed through a link mechanism that connects the front side of the door to a cab box and through a slide mechanism that connects the rear side of the door to the cab box.

An operator cab according to the present invention is provided for a construction machine, and the operator cab comprises a cab box, a door, a bumper, a slide member, a closed door stopper and an opened door stopper. The cab box has an internal cab room and an entrance into the cab room, and the door is attached at the entrance such that the entrance is closed when the door is moved forward, and it is opened when the door is moved rearward. The bumper is provided at the rear end of the door, and the slide member is connected pivotally to the rear end of the door so as to freely swing horizontally and slides back and forth along a slide rail, which is provided externally on the cab box, the slide rail extending in a back-and-forth direction. The closed door stopper is provided in front of the slide rail while the opened door stopper is provided in rear of the slide rail. In the operator cab, when the door shifts forward by a forward movement of the slide member along the slide rail and reaches its closed position where the entrance is closed by the door, the bumper fits with the closed door stopper to keep the rear end of the door at the closed position. On the other hand, when the door shifts rearward and opens by a rearward movement of the slide member along the slide rail, the bumper fits with the opened door stopper to keep the rear end of the door at its opened position.

As a construction machine to which the present invention relates, there is such a construction machine as a hydraulic mini-shovel 50, whose vehicle body supports an operator cab rotatably as mentioned in the following embodiment.

It is preferable that the slide member be connected pivotally to the bumper so as to freely swing horizontally. Furthermore, it is preferable that the slide rail be provided approximately at the vertical center of the external surface of the cab box in rear of the entrance, the slide rail extending in the back-and-forth direction.

The above described operator cab may be arranged such that the front end of the door is attached to the front side of the entrance of the cab box by a link member, whose one end is connected pivotally to the cab box and whose other end is connected pivotally to the front end of the door, the link member capable of freely swinging horizontally.

It is preferable that the link member comprise an upper link member and a lower link member, which are connected pivotally to the upper front end and the lower front end of the door, respectively, the upper and lower link members being capable of freely swinging horizontally. It is also preferable that the lower link member be provided below the floor of the cab box, so that the lower link member never intrudes the cab room.

Furthermore, the front end of the door may be arranged to slide back and forth with respect to the cab box by providing a front slide member at the front end of the door, the front slide member capable of sliding back and forth with respect to the cab box.

Moreover, it is preferable that part of the side of the cab box including the door in its closed condition be flat and extend linearly in the back-and-forth direction in a top view.

By constructing the operator cab for a construction machine in a way as described above according to the present invention, a good feel of the door operation, i.e., the opening and closing of the door, is achieved because the movement of the door just before the complete closure is directed inward in a similar way as a prior-art hinged door. This inward movement of the door at the final moment of the closing pushes a seal member, which is provided to seal the door to the cab box, head-on, so the seal member achieves a high endurance and a high watertightness. Furthermore, the present invention provides an improved safety because the door never drops off from the cab box even if the slide member comes out of the slide rail accidentally, because the front part of the door is supported by the link members. Moreover, because the bumper of the slide member is used also as a part to fit with the closed door stopper and with the opened door stopper, the side of the cab box is not disorderly, so the operator cab according to the present invention has a fine external appearance in addition to the firmness of the door achieved by the stoppers fixing the bumper, which is provided on the door.

Additionally, the link members, which comprise upper and lower link members at the upper and lower ends, respectively, of the door, contribute to the improvement in the feel of the door operation because this arrangement of the link members eliminates any looseness in the support of the front part of the door. Furthermore, as the lower link member is arranged never to enter the cab room, the safety and convenience of the operator getting into and out of the operator cab are not jeopardized. Moreover, the positioning of the slide rail approximately at the vertical center facilitates the smoothness of the door operation.

According to the present invention, the part of the side of the cab box that includes the door extends linearly in a top view. This design enables to provide relatively large widths for the front and the rear of the operator cab and thereby secures a wider space especially at the feet of the operator in the cab room.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIGS. 5A and 5B are views showing important parts of a slide mechanism of the first embodiment, including an opened door stopper. FIG. 5A is a top view while

FIGS. 8A and 8B are plan views showing the contour of the operator cab. FIG. 8A shows the cab with its door closed while

FIGS. 9A and 9B are views of a link member with a roller, which is provided in the first embodiment. FIG. 9A is a top view while

DESCRIPTION OF THE PREFERRED EMBODIMENTS

Figure 2:
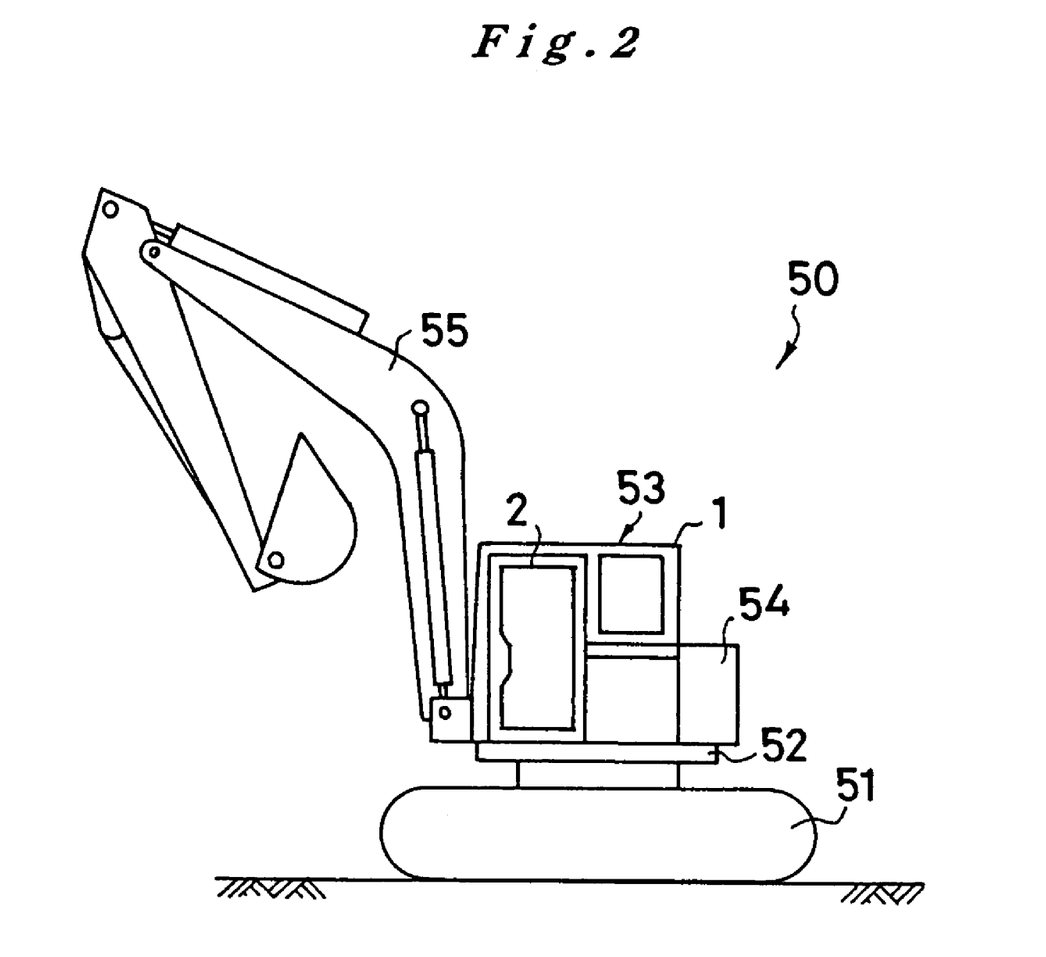
FIG. 2 is a side view of a construction machine as an example which incorporates an operator cab according to the present invention.

Now, preferred embodiments according to the present invention are described in reference to the drawings. Before an operator cab according to the present invention is described, a hydraulic mini-shovel 50 as an example of construction machine that incorporates an operator cab is described in reference to FIG. 2. The mini-shovel 50 comprises a vehicle body 51 and a swivel base 52. The vehicle body 51 includes a crawler device by which it is capable of traveling. The vehicle body 51 supports rotatably the swivel base 52, so that the swivel base 52 can rotate horizontally with respect to the vehicle body 51, and an operator cab 53 and an engine room 54 are provided on the swivel base 52. In addition, a work device 55 is provided pivotally in front of the cab on the swivel base 52, and the work device 55 is driven by hydraulic cylinders, so that it can stretch and bend to perform a desired work. On a side of the cab box 1, which constitutes the operator cab 53, there is a door 2, which is opened and closed for an operator to get into or get out of the operator cab 53.

First Embodiment

Figure 1:
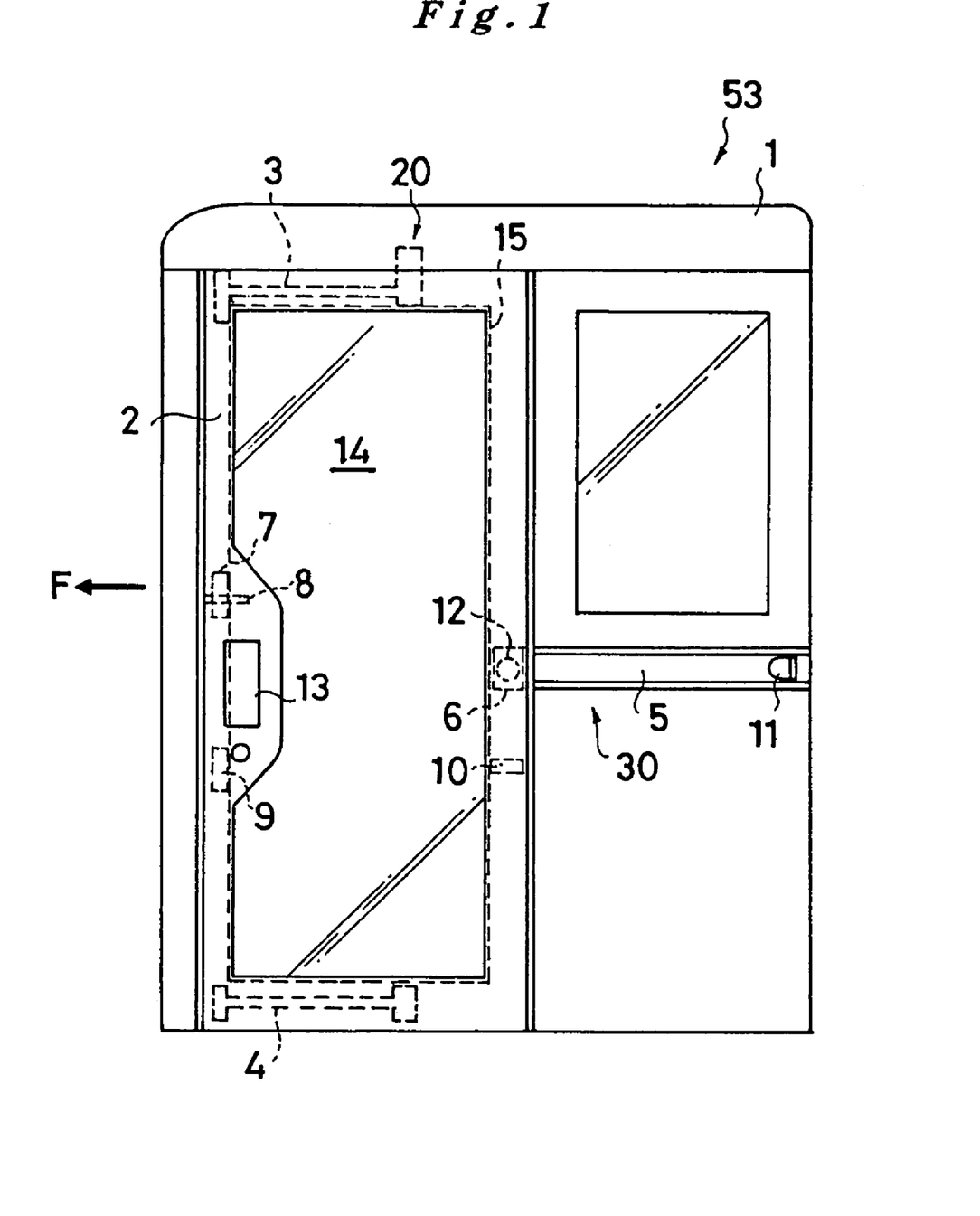
FIG. 1 is a side view of an operator cab for a construction machine as a first embodiment according to the present invention.

Now, the construction of a door 2 as a first embodiment, which is attached to the operator cab 53, is described in reference to FIG. 1~FIG. 8. In the following description, the direction of the closing of the door is referred to as "forward" (arrow F in FIG. 1). As shown in FIG. 1, the door 2, whose front side is attached to the cab box 1 by a link mechanism 20 and whose rear side is attached to the cab box 1 by a slide mechanism 30, opens and closes an entrance 15 to the cab room 1a, which is defined by the cab box 1. The link mechanism 20 comprises an upper link member 3, which is located at the upper part of the door 2, and a lower link member 4, which is located at the lower part of the door 2. One end of each link member is connected pivotally to the cab box 1, and the other end is connected pivotally to the door 2, so that the link members can swing freely. On the other hand, the slide mechanism 30, which is positioned approximately at the vertical center of the entrance 15, comprises a slide rail 5, which is provide on the external side of the cab box 1, and a slide member 6, which slides along the slide rail 5.

Figure 3:
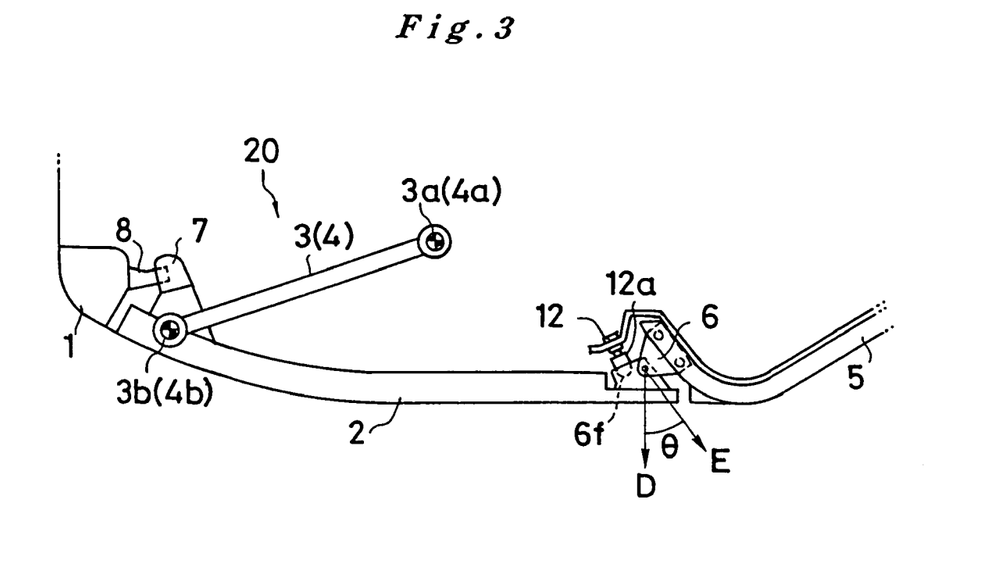
FIG. 3 is a plan view of important parts of the operator cab as the first embodiment, with its door closed.
Figure 4:
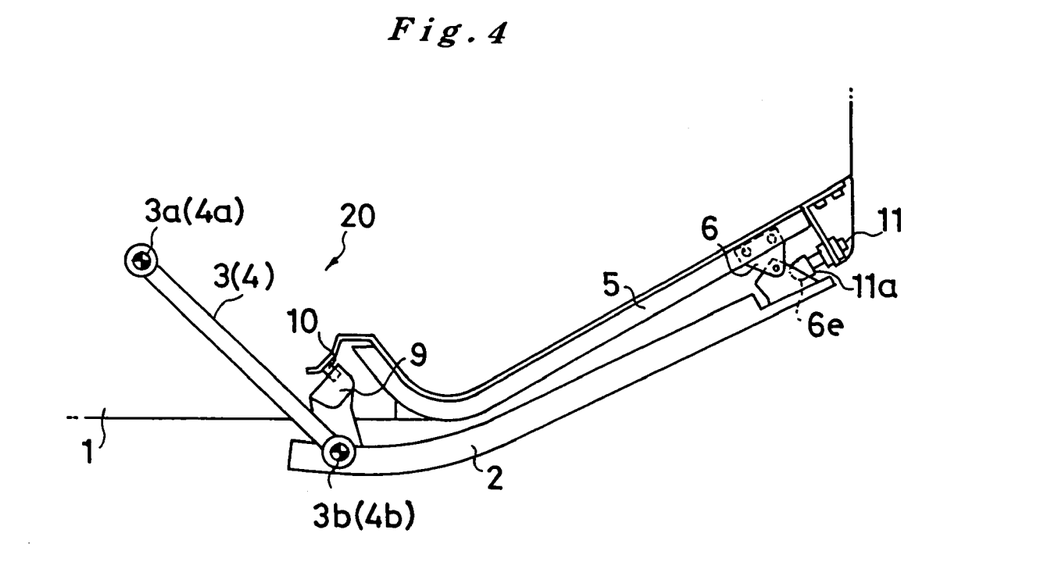
FIG. 4 is a plan view of the same important parts of the operator cab as the first embodiment, with its door opened.

As mentioned above, the upper and lower link members 3 and 4, which constitute the link mechanism 20, one ends (fixed ends 3a and 4a) are connected pivotally to the cab box 1 so as to swing freely while the other ends (3b and 4b) are connected pivotally to the upper and lower front ends of the door 2 so as to swing freely as shown in FIG. 3 and FIG. 4. In these plan views, the pivots of the fixed ends 3a and 4a of the upper and lower link members 3 and 4 are oriented vertically one above the other, so the upper and lower link members 3 and 4 rotate or swing around the fixed ends 3a and 4a when the door 2 opens and closes as shown in FIG. 3 and FIG. 4. The fixed end 4a of the lower link member 4 is positioned lower than the floor of the cab box 1, so the lower link member 4 including the fixed end 4a never enter the cab box 1 (cab room 1a). This design facilitates the safety as well as the ease of the getting on and off of the operator.

Figure 5A:
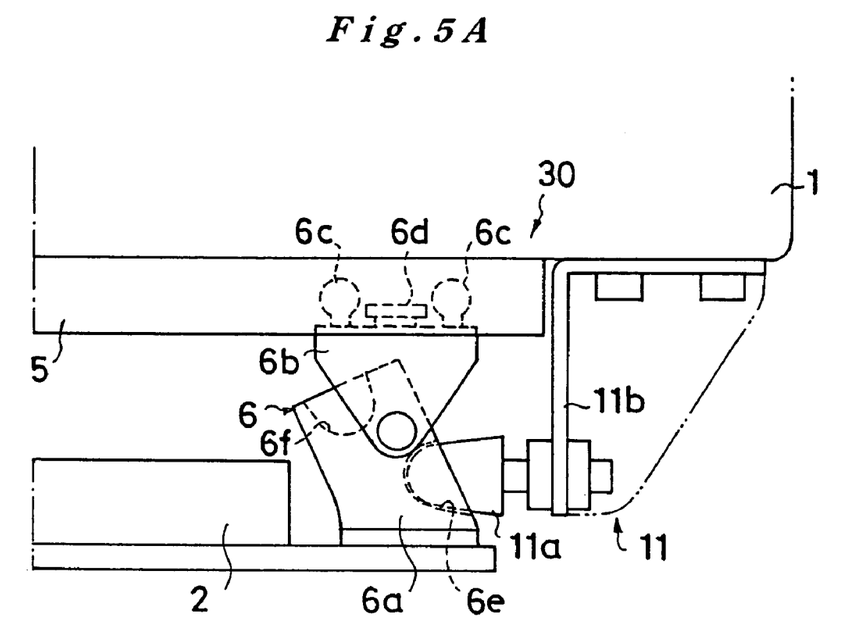
Figure 5B:
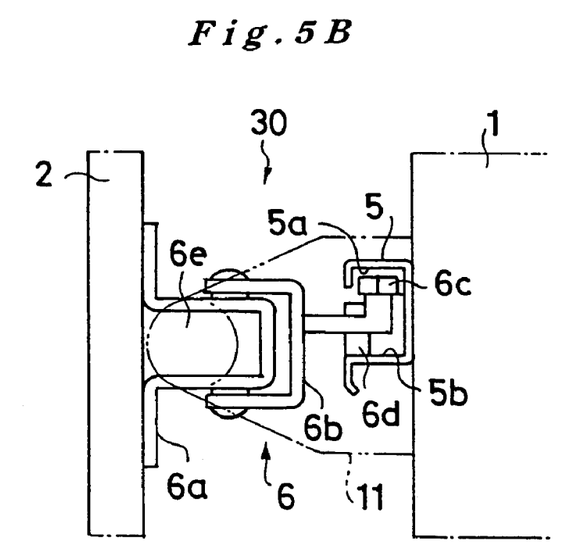
FIG. 5B is a rear view.
Figure 6:
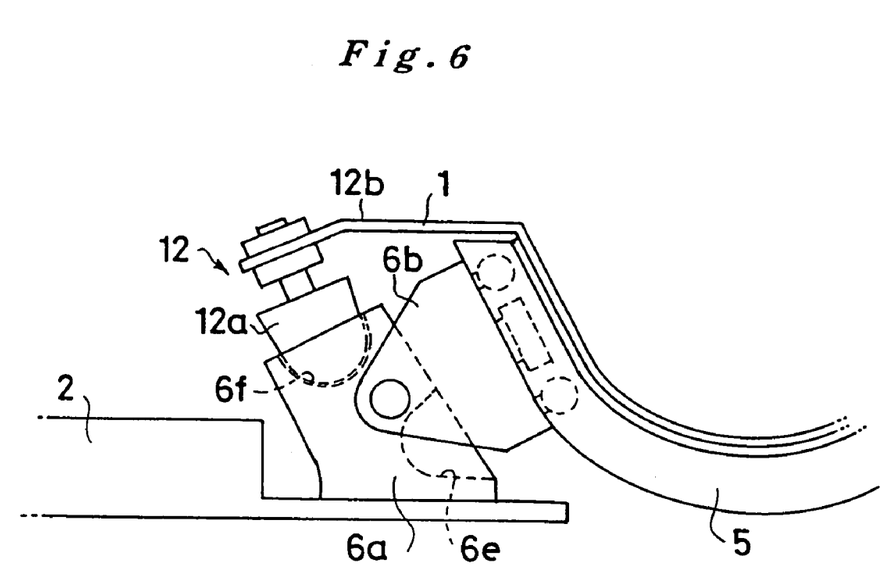
FIG. 6 is a plan view of important parts of the slide mechanism of the first embodiment, including a closed door stopper.
Figure 7:
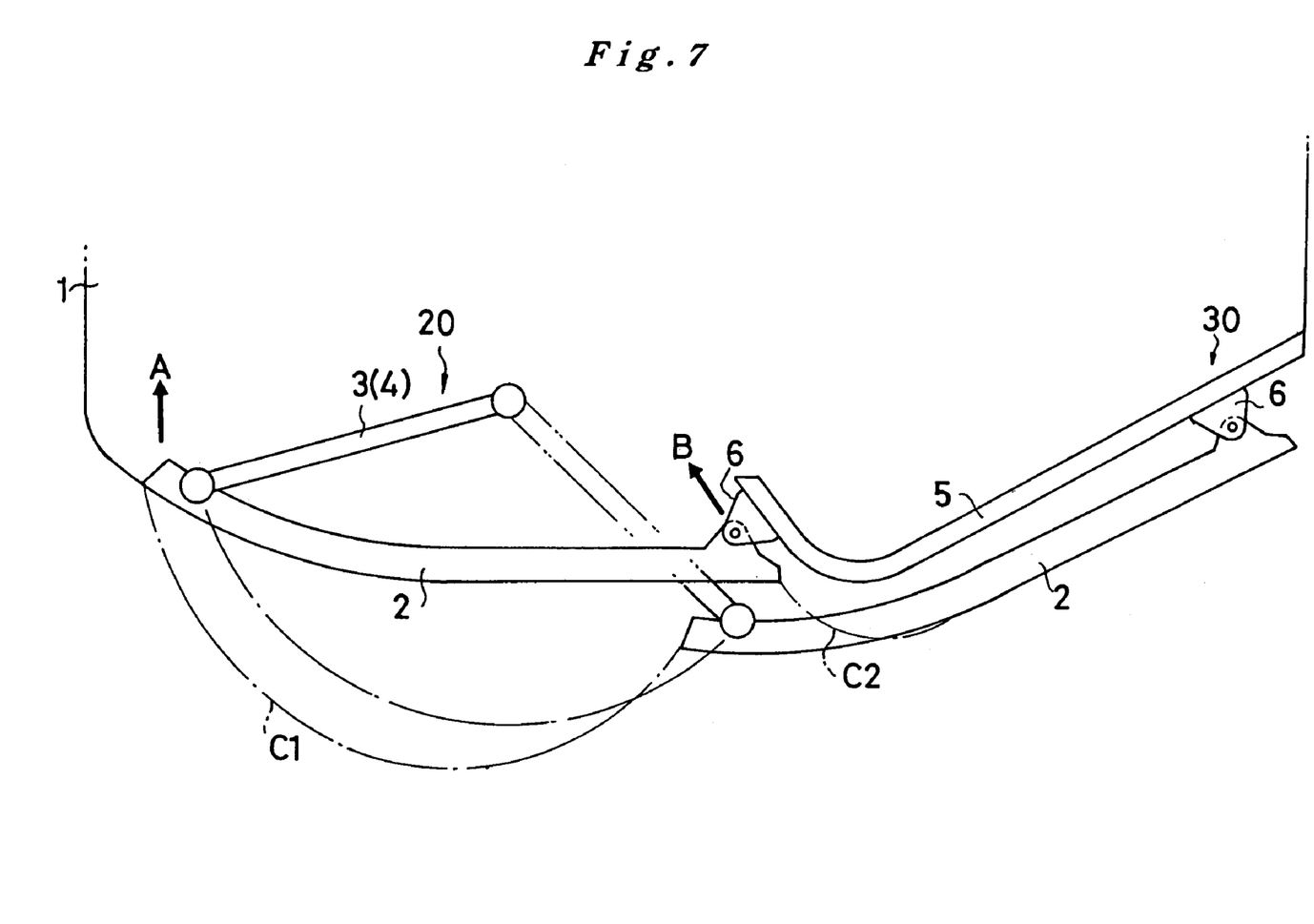
FIG. 7 is a plan view showing the path the door of the first embodiment track through when it is opened and it is closed.

As mentioned above, the slide mechanism 30 comprises a slide rail 5, which extends in the back-and-forth direction behind the entrance 15 and approximately at the vertical center of the entrance 15 outside the cab box 1, and a slide member 6, which is attached to the door 2 and slides along the slide rail 5, as shown in FIG. 1, FIG. 5 and FIG. 6. The slide rail 5 has a groove whose open side faces outward, and the outward end of the upper side of the groove is bent downward to form a rail groove 5a. The slide member 6, which is attached on the rear inside (the side facing the cab box 1) part of the door 2 approximately at the vertical center thereof, comprises a bumper 6a, which fits with stoppers 11 and 12 described later, a rocker 6b, which is connected pivotally to the bumper 6a so as to swing freely, and guide rollers 6c and a center roller 6d, which are positioned in the groove of the slide rail 5 so as to slide inside the groove.

In a condition where the slide member 6 is attached to slide along the slide rail 5, the guide rollers 6c, which are positioned in the rail groove 5a of the slide rail 5, roll and slide along the rail groove 5a, and the center roller 6d rolls and slides along the lower side 5b of the groove of the slide rail 5. Because the outward end of the upper side of the slide rail 5 is bent downward, defining the rail groove 5a, as mentioned above, the guide rollers 6c never go out of the rail groove 5a, so they securely guide the sliding of the slide member 6 along the rail groove 5a. Also, because the rocker 6b of the slide member 6 can swing with respect to the bumper 6a, the door 2 swiveling the rocker 6b can slide even though the slide rail 5 is bent as shown in FIG. 6.

At the front part of the door 2, a closed door lock 7 is provided to keep the closed condition of the door 2, and the closed door lock 7 is engaged with a closed door striker 8, which is provided at the part of the cab box 1 facing the closed door 2 (at the front of the entrance 15) as shown in FIG. 3. Also, at the front part of the door 2, an opened door lock 9 is provided to keep the opened condition of the door 2, and the opened door lock 9 is engaged with an opened door striker 10, which is provided at the part of the cab box 1 facing the opened door 2 (at the rear of the entrance 15) as shown in FIG. 4. In this embodiment, the closed door lock 7 and the opened door lock 9, which are provided at the front part of the door 2, are embodied as separate parts. However, they can be designed as a common part in another embodiment.

The cab box 1 is provided with an opened door stopper 11, which fits with the bumper 6a at the rear part of the door 2 when the door is opened, keeping the opened condition of the door, and with a closed door stopper 12, which fits with the bumper 6a at the rear part of the door 2 when the door is closed, keeping the closed condition of the door. The opened door stopper 11 comprises a bracket 11b, which is mounted in rear of the slide rail 5, and a protruding part 11a, which is mounted on the bracket 11b and extends (in the back-and-forth direction) approximately in parallel with the slide rail 5 as shown in FIG. 5. The closed door stopper 12 comprises a bracket 12b, which is mounted in front of the slide rail 5, and a protruding part 12a, which is mounted on the bracket 12b and extends outward with respect to the cab box 1 as shown in FIG. 6. The opened door stopper 11 and the closed door stopper 12 are designed such that the protruding part 11a or the protruding part 12a fits with the bumper 6a of the slide member 6 when the door is opened or closed, respectively. The protruding part 11a of the opened door stopper 11 fits with the bumper 6a when it enters a fitting recess 6e provided on a side of the bumper 6a as shown in FIG. 5. On the other hand, the protruding part 12a of the closed door stopper 12 fits with the bumper 6a when it enters a fitting recess 6f provided at the end of the bumper 6a as shown in FIG. 6. In addition, the opened door stopper 11 functions to prevent the slide member 6 from going out of the respective end of the slide rail 5.

In a case of a prior-art door whose front and rear slide, a tab tail (a part of a mechanism in which a convex is inserted into a concave for fixation) is provided at the front part of the door for fixing the opened door, and a mating part is provided on (a center pillar part of) the cab box. In this case, because clumsy brackets for mounting the tab tail are required at the front upper and lower ends of the door, the brackets obstruct the view and impair the safety. Moreover, because stoppers are mounted on the rear external side of the cab box, protruding outward, this design is not good in appearance and safety. On the other hand, in the embodiment according to the present invention, only the opened door stopper 11, which is for fixing the rear part of the door, is provided externally along the rear part of the slide rail 5. The closed door stopper 12, the bumper 6a and the like are provided inside the door 2, so they are not visible from the outside. As a result, the operator cab according to the present invention provides improvements in appearance (external design) and safety and in the range of vision.

At the front part of the door 2, a handle 13 is provided for opening and closing the door 2 from the inside and outside of the cab box 1. The handle 13 is used to release the engagement between the closed door lock 7 and the closed door striker 8 for opening the door 2 or to release the engagement between the opened door lock 9 and the opened door striker 10 for closing the door 2. Because the mechanism used for opening and closing the door 2 is provided integrally at the front part of the door 2 (approximately at the vertical center in FIG. 1), the construction of the door 2 is relatively simple. As a result, the door 2 can be made thinner, and the door, which has been press-molded conventionally, can be now made with a pipe frame. In this way, it is possible to reduce the weight as well as the manufacturing cost of the door 2. Furthermore, the door 2 can be provided with a window 14 at the central part of the door 2 to increase the field of vision from the inside of the cab box 1.

As shown in FIG. 3, which shows the door 2 in its closed condition, when the door 2 is closed, the closed door lock 7, which is provided at the front part of the door 2, engages with the closed door striker 8, fixing the front part of the door. At the same time, the protruding part 12a of the closed door stopper 12 fits with the fitting recess 6f of the bumper 6a of the slide member 6, fixing the rear part of the door. In this condition, the front part of the door 2 is fixed on the cab box 1 without any looseness as it is supported by the upper and lower link members 3 and 4.

As shown in FIG. 4, which shows the door 2 in its opened condition, when the door 2 is opened, the opened door lock 9, which is provided at the front part of the door 2, engages with the opened door striker 10, fixing the front part of the door. At the same time, the protruding part 11a of the opened door stopper 11 fits with the fitting recess 6e of the bumper 6a of the slide member 6, fixing the rear part of the door. In this condition, the front part of the door 2 is fixed on the cab box 1 also without any looseness as it is supported by the upper and lower link members 3 and 4.

In this embodiment, as the door 2 is supported by the link mechanism 20, the door 2, which is retained by the link mechanism 20, will not come off from the cab box 1 even if the slide member 6 comes out of the slide rail 5. In this way, the present invention provides an improved safety.

There is a clearance between the slide rail 5 and the guide rollers 6c and center roller 6d of slide member 6 for these rollers to rotate, and the rocker 6b, which retains the guide rollers 6c and the center roller 6d, swings with respect to the bumper 6a. The clearance and the swing cause the rear part of the door 2 to be a little shaky during the opening and closing. However, the door 2 is secured without looseness when the opened door stopper 11 and the closed door stopper 12 engage with the bumper 6a of the slide member 6 to fix the door 2, respectively when the door 2 is opened and when it is closed as mentioned above. Furthermore, because the fitting recesses 6e and 6f that fit with the stoppers 11 and 12 for fixing the door 2 are provided not as separate parts but as part of the bumper 6a of the slide member 6, the side of the cab box 1 is smooth without protrusions that may impair the external look of the operator cab.

Now, the movement of the door 2, which is constructed as described above, is described in reference to FIG. 7. As mentioned above, the front part of the door 2 is swung by the link mechanism 20 while the rear part is slid by the slide mechanism 30. As a result, the path of the door 2 during the opening and the closing is determined by the link mechanism 20 and the slide mechanism 30, so the front end of the door moves along track C1 indicated in FIG. 7 while the rear end moves along track C2. As far as the track of the door just before the completion of the closing is concerned, the front end moves inward in the direction indicated by arrow A in FIG. 7, and this movement is similar to that of a hinged door. In a case of a prior-art door whose front and rear slide, the track of the door just before the complete closure is toward a direction (inward) different from the rotational direction (back-and-forth direction) of the rollers, which rotate along the rail. Therefore, just before the door completely closes, the rollers stop rotating and slide, making the door feel heavier for the operator. This results in a bad feel of the door operation. On the other hand, in the case of the embodiment according to the present invention, the door does not become heavier at the final moment of the closing as the link mechanism 20 swings, so the present invention provides a good feel of the operation. Furthermore, in a case of a door whose front slide, there is looseness, which makes a bad feel of the door operation, but in the case of the present invention, there is no looseness as the front part of the door 2 is supported by the link mechanism 20. As a result, the present invention provides a good feel of the door operation. Moreover, a seal member (not shown), which is provided on the door 2 to seal the door to the cab box 1, is pushed in the direction indicated by arrow A in FIG. 7 when the door is closed, so the seal member never slides as in the case of the prior-art sliding door. As a result, the operator cab according to the present invention can have a high endurance and watertightness.

As shown in FIG. 3, the direction of the closed door stopper 12 to the fitting recess 6f is set in parallel with the sliding direction E of the slide member 6, which has an angle θ with respect to the direction D perpendicular to the line connecting the fixed ends 3a and 4a of the upper and lower link members 3 and 4 or the engaging point of the closed door lock 7 with the closed door striker 8 and the pivot of the slide member 6. Therefore, the rear part of the door 2 moves in the direction indicated by arrow B in FIG. 7 in correspondence to the shape of the slide rail 5 other than in the direction indicated by arrow A when the door closes completely. Then, the closed door lock 7 engages with the closed door striker 8 at the front part of the door 2 to fix the door. In this closed condition, the door 2 is fixed without looseness. Furthermore, the slide mechanism 30 enables the rear part of the door 2 to slide into the side of the cab box 1, so that the rear part of the door 2 is positioned approximately in the same plane as the cab box 1 when the door 2 is closed. In this closed condition, the rear part of the door 2 does not protrude from the side of the cab box 1.

Figure 8A:
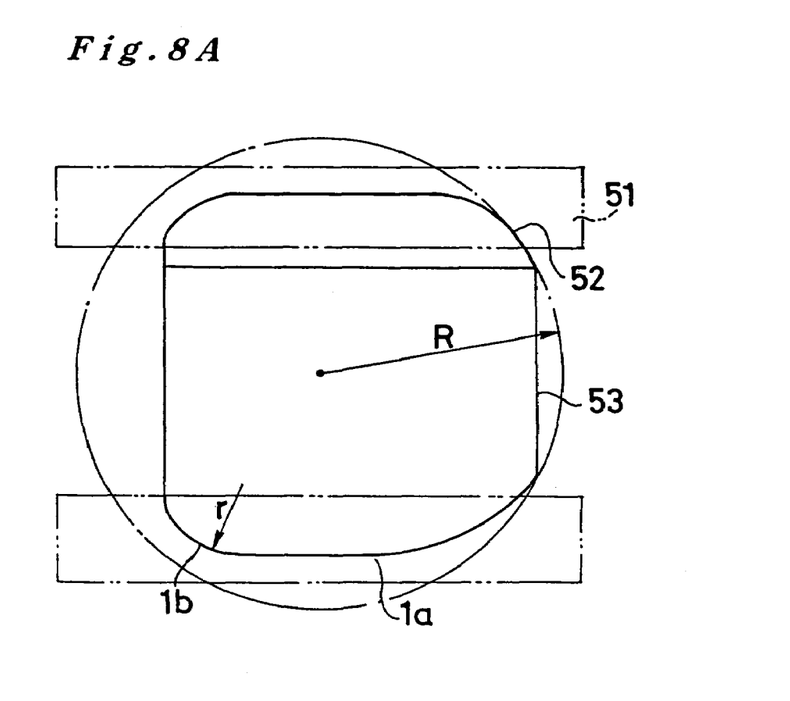
Figure 8B:
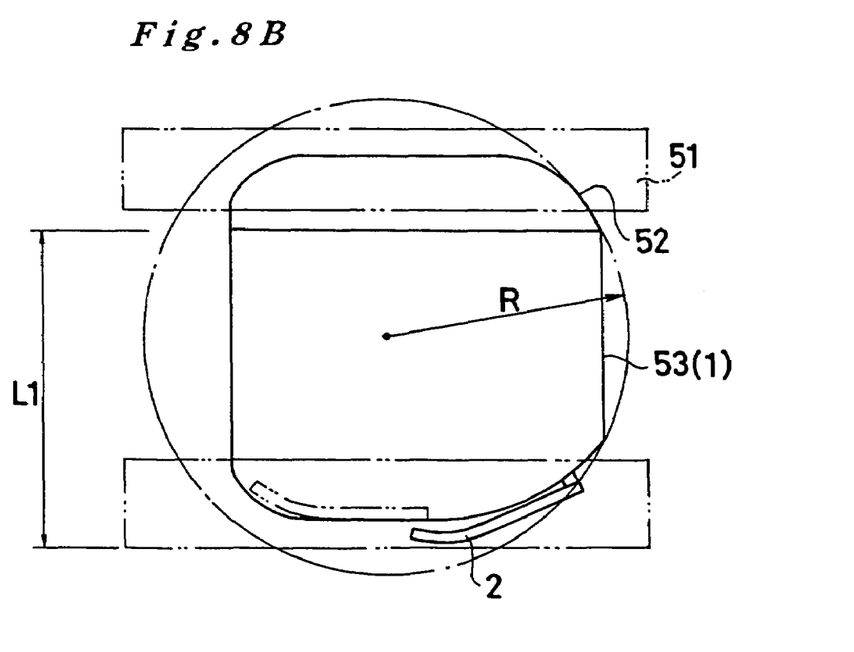
FIG. 8B shows the cab with its door opened.

As for the shape of the operator cab 53 (cab box 1), the part 1a of the side of the cab box 1 where the door 2 is attached on the cab box 1 extends linearly in the back-and-forth direction in a plan view as shown in FIG. 8A, and the front end 1b of the linear side 1a of the cab box 1 is rounded with a radius of curvature r also in a plan view. In the above mentioned prior-art operator cab, the side of the cab box where the door is provided is rounded including the door, so the width of the cab room is narrower at the front and the rear of the operator cab. As a result, the operator in the prior-art operator cab has not had as much space at his feet as in the case of the present invention. In other words, with the same width for the operator cab, the embodiment according to the present invention, which has partly a linearly extending side, secures a wider space at the feet of the operator in the operator cab 53. The door 2, which constitutes the linear side 1a of the cab box 1, also has its rear part extending linearly. As shown in FIG. 8A, even though a little part of the rear end of the door 2 exceeds the turning radius R when the door 2 is opened, the width L1 of the operator cab 53 with its door 2 open almost equals that of the prior-art operator cab, in which the front and the rear of the door slide, so the protrusion of the door of the operator cab according to the present invention does not present any practical problem.

Figure 9A:
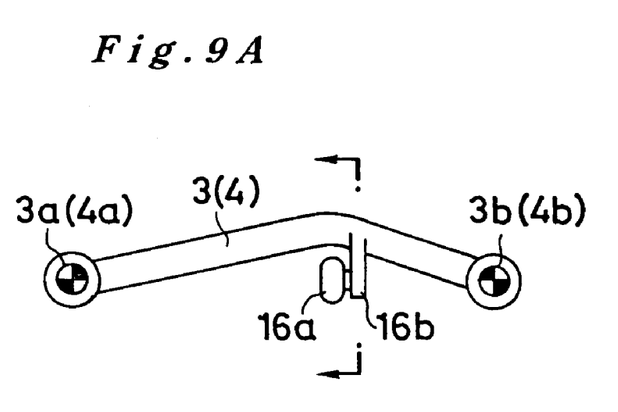
Figure 9B:
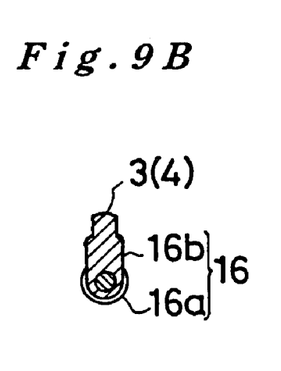
FIG. 9B is a side view.

In a case where the door 2 is made larger and heavier, the upper and lower link members 3 and 4, which constitute the link mechanism 20, are strengthened with rollers 16, which are provided to carry the weight of the door 2 as shown in FIG. 9. In this case, plate-like support members (not shown) are provided immediately below the upper and lower link members 3 and 4, and the rollers 16 roll over these support members when the door 2 is opened and closed. Each roller 16 comprises a bearing portion 16b, which extends laterally from the link member 3 or 4, and a roller member 16a, which is mounted rotatable on the bearing portion 16b. In this case, the rotational axis of the roller member 16a is positioned in line with the fixed end 3a (4a) and the moving end 3b (4b) of the link member 3 or 4. Depending on the weight of the door 2, the roller member 16a is provided in singularity either on the upper link member 3 or on the lower link member 4.

In the above described embodiment, the bumper 6a of the slide member 6 is provided with fitting recesses 6e and 6f, with which the protruding parts 11a and 12a of the stoppers 11 and 12 are engaged. However, instead, the stoppers 11 and 12 may be provided with fitting recesses, and the bumper 6a may be provided with protruding parts, which can fit with these fitting recesses.

Second Embodiment

In the first embodiment, the front part of the door 2 is supported by the link mechanism 20 while the rear part is supported by the slide mechanism 30. However, it is possible that both the front and rear of the door be supported either by a link mechanism or by a slide mechanism alone, so each of such cases is described in the following, where components identical to those of the first embodiment are indicated by the same numerals to leave out redundant explanation.

Figure 11:
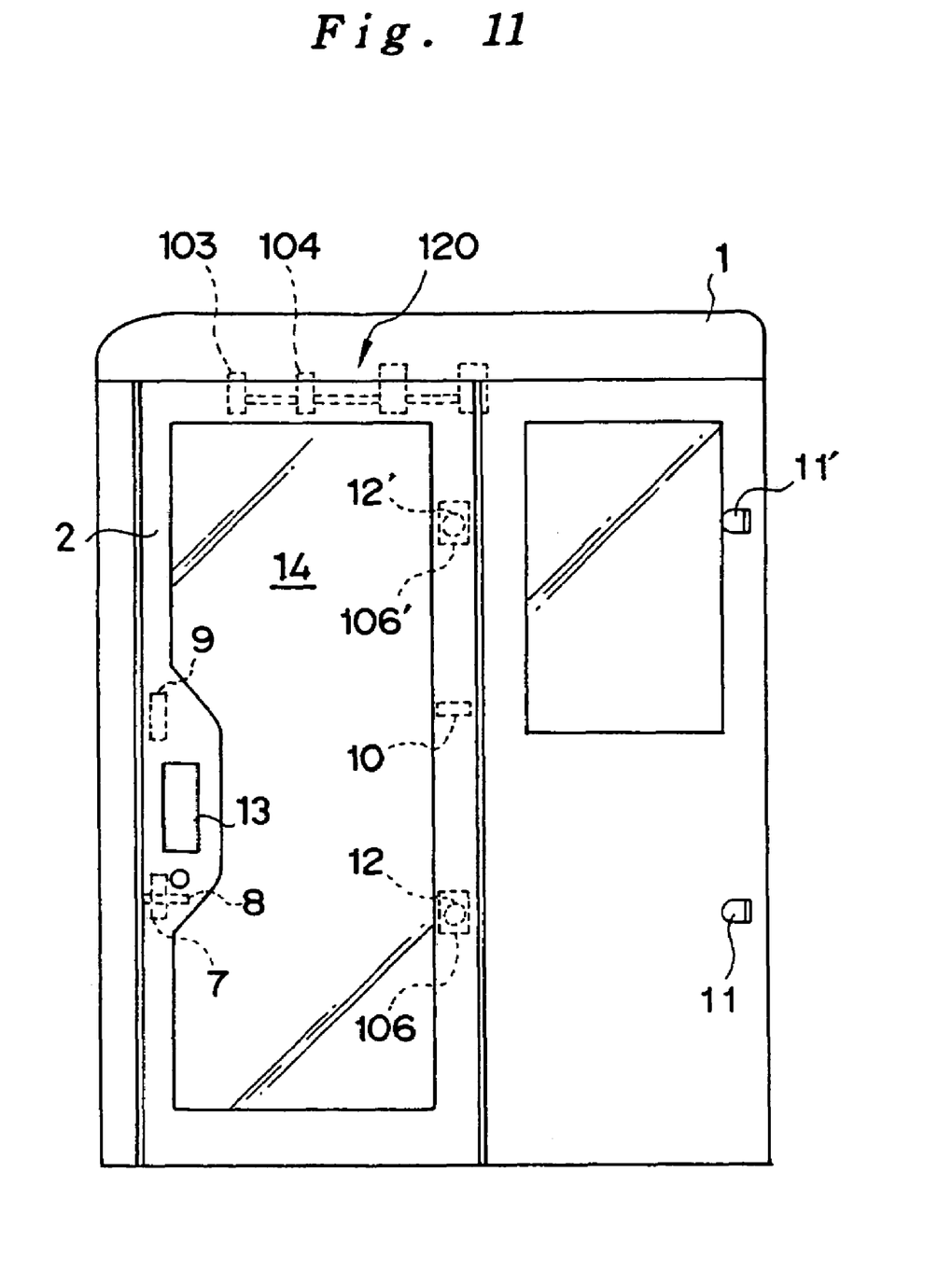
FIG. 11 is a side view of an operator cab for a construction machine as a second embodiment according to the present invention.
Figure 12:
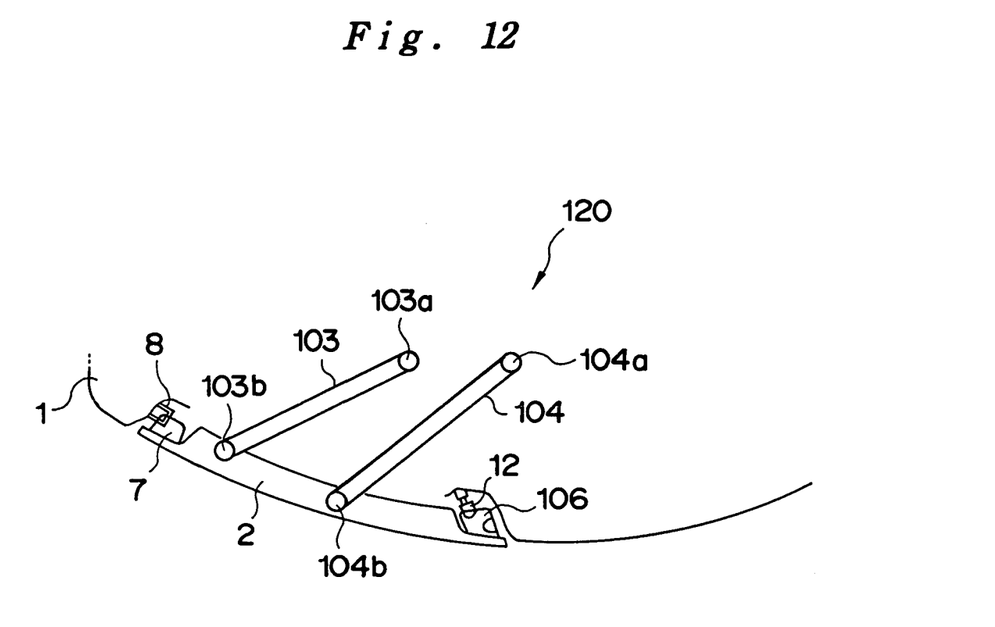
FIG. 12 is a plan view of important parts of the operator cab as the second embodiment, with its door closed.
Figure 13:
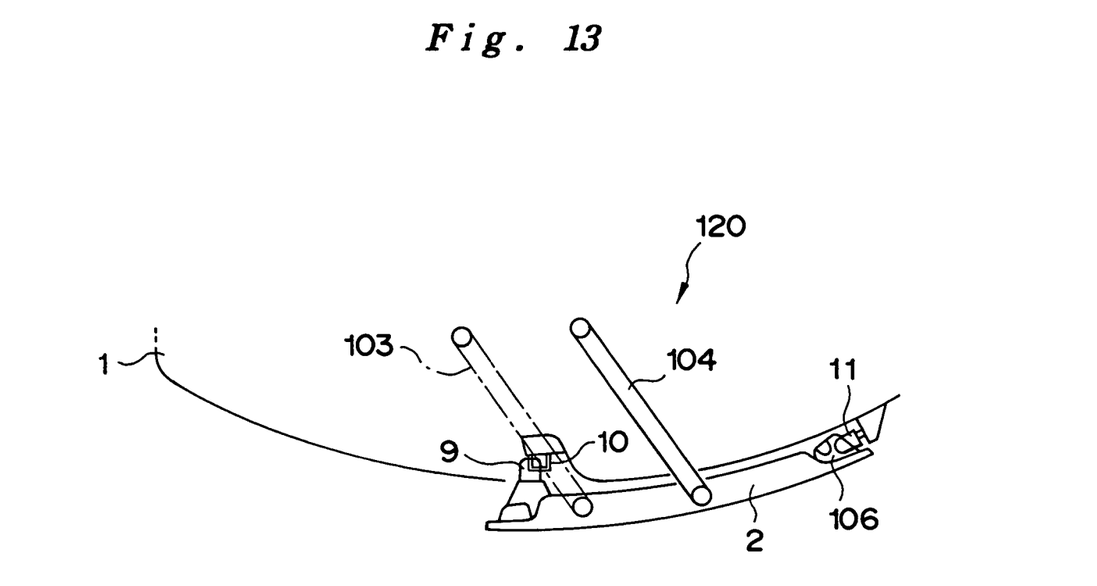
FIG. 13 is a plan view of the same important parts of the operator cab as the second embodiment, with its door opened.

At first, as a second embodiment, a case where both the front and rear parts of the door 2 are supported by a link mechanism 120 is described in reference to FIG. 11~FIG. 13. The link mechanism 120 in the second embodiment comprises a front link member 103 and a rear link member 104, which are positioned, respectively, one in front of the other. One end (fixed end 103a or 104a) of each link member is connected pivotally to the cab box 1 at the upper part thereof, and the other end (moving end 103b or 104b) is connected pivotally to the door 2 at the upper part thereof, so that both the link members can swing freely.

At the rear pat of the door 2, provided is a bumper 106 designed to engage with the stopper 11, which is provided at the rear pat of the cab box 1, when the door 2 is opened, and by this engagement, the door 2 is kept in its opened condition. Also, the bumper 106 is designed to engage with the stopper 12, which is provided approximately at the central part of the cab box 1, when the door 2 is closed, and by this engagement, the door 2 is kept in its closed condition. The bumper 106 has the same shape as the bumper 6a of the slide member 6 in the first embodiment.

Also, in the second embodiment, when the door 2 is closed as shown in FIG. 12, the closed door lock 7, which is provided at the front part of the door 2, engages with the striker 8, which is provided on the cab box 1, fixing the front part of the door 2. In this instance, the bumper 106 engages with the stopper 12, fixing the rear part of the door 2. On the other hand, when the door 2 is opened as shown in FIG. 13, the opened door lock 9, which is provided at the front part of the door 2, engages with the striker 10, which is provided on the cab box 1, fixing the front part of the door 2, and in this instance, the bumper 106 engages with the stopper 11, fixing the rear part of the door 2.

As described above, even though the door 2 is supported only by the link mechanism 120, because the handle 13, the closed door lock 7 and the opened door lock 9 are provided in concentration at the front part of the door 2, the construction of the door 2 is relatively simple. Therefore, it is possible to make the door 2 thin or to make the door 2 with a pipe frame. Furthermore, the door 2 can be provided with a window 14 at the central part of the door 2.

As shown in FIG. 11, the above embodiment has been described to comprise the link mechanism 120, which is provided at the upper part of the door 2. However, a link mechanism similar to the link mechanism 120 may be provided additionally at the lower part of the door 2 to support the door 2 at the upper and lower parts thereof. The stoppers 11 and 12 and the bumper 106 as a group can be increased in number in correspondence to the size or the required strength of the vehicle body of, for example, the hydraulic mini-shovel 50 (for example, stoppers 11' and 12' and a bumper 106' may be added as shown in FIG. 11).

Third Embodiment

Figure 14:
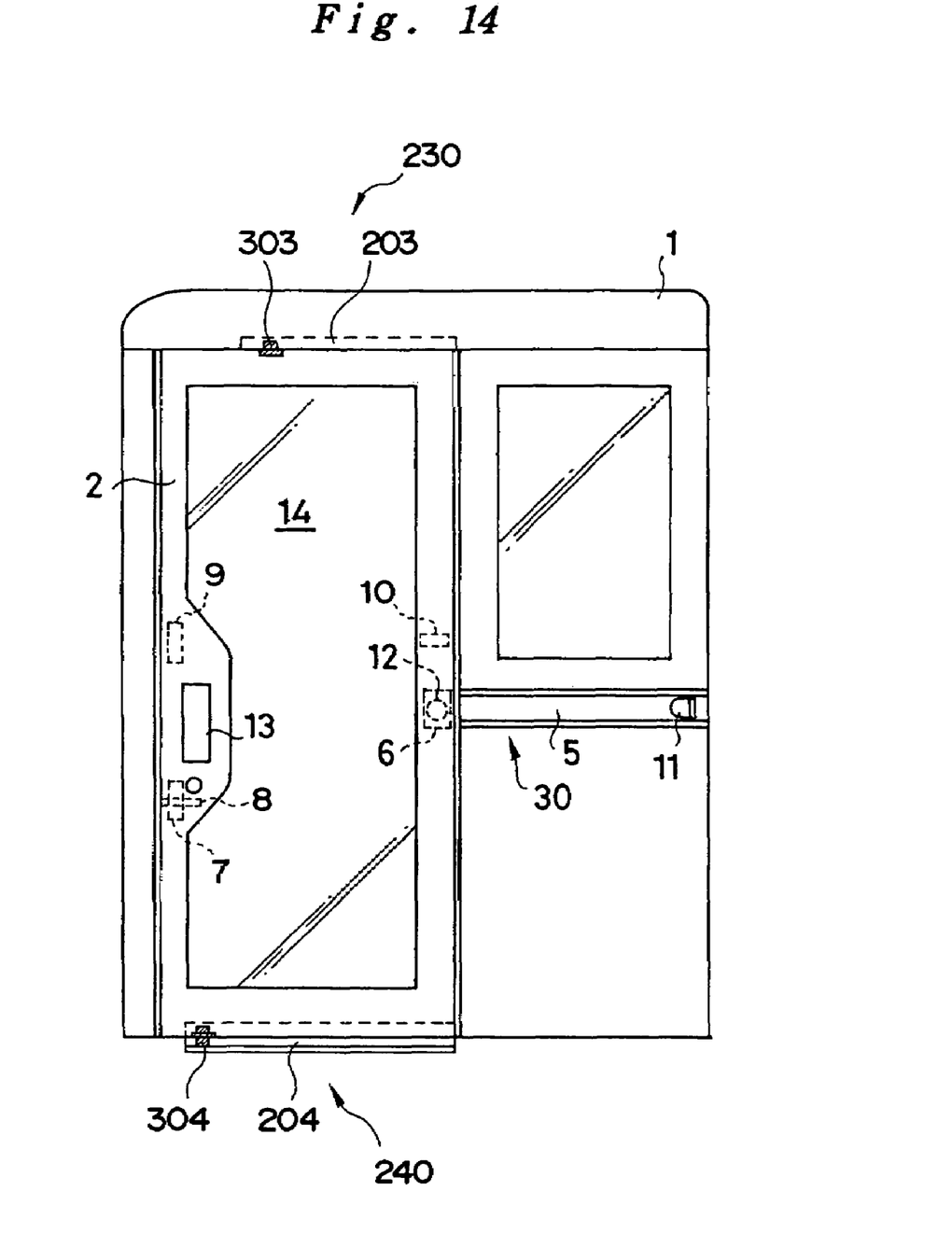
FIG. 14 is a side view of an operator cab for a construction machine as a third embodiment according to the present invention.
Figure 15:
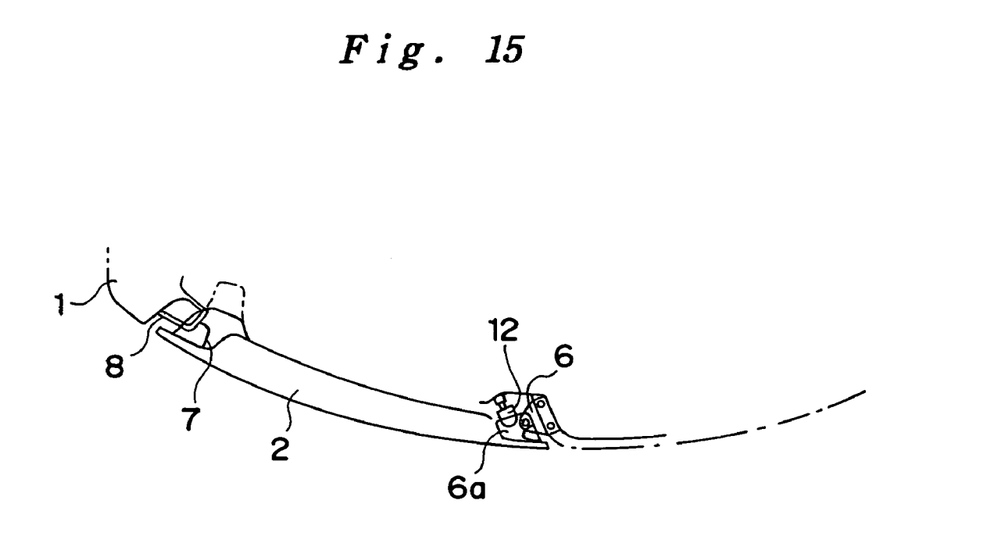
FIG. 15 is a plan view of important parts of the operator cab as the third embodiment, with its door closed.
Figure 16:
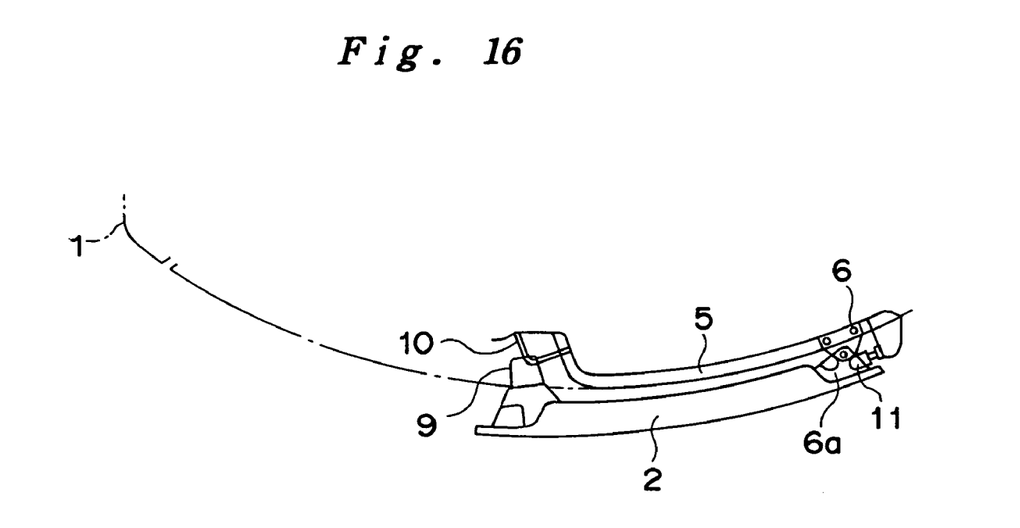
FIG. 16 is a plan view of the same important parts of the operator cab as the third embodiment, with its door opened.

As a third embodiment, a case where both the front and rear parts of the door 2 are supported only by slide mechanisms 30, 230 and 240 is described in reference to FIG. 14~FIG. 16. In the third embodiment, the upper front part of the door 2 is supported by the upper slide mechanism 230, the lower front part of the door 2 is supported by the lower slide mechanism 240, and the approximate, vertical center of the rear part of the door 2 is supported by the slide mechanism 30, which is the same as the first embodiment.

The upper slide mechanism 230 comprises an upper slide rail 203, which is attached on the cab box 1 along the upper side of the entrance of the cab box 1, and an upper slide member 303, which slides along the upper slide rail 203. The lower slide mechanism 240 comprises a lower slide rail 204, which is attached on the cab box 1 along the lower side of the entrance, and a lower slide member 304, which slides along the lower slide rail 204.

Also, in the third embodiment, when the door 2 is closed as shown in FIG. 15, the closed door lock 7, which is provided at the front part of the door 2, engages with the striker 8, which is provided on the cab box 1, fixing the front part of the door 2, and at the same time, the bumper 6a engages with the stopper 12, fixing the rear part of the door 2. On the other hand, when the door 2 is opened as shown in FIG. 16, the opened door lock 9, which is provided at the front part of the door 2, engages with the striker 10, which is provided on the cab box 1, fixing the front part of the door 2, and at the same time, the bumper 6a engages with the stopper 11, fixing the rear part of the door 2.

As a result, even though the door 2 is supported only by the slide mechanisms 30, 230 and 240, because the handle 13, the closed door lock 7 and the opened door lock 9 are provided in concentration at the front part of the door 2, the construction of the door 2 is relatively simple. Therefore, it is possible to make the door 2 thin or to make it with a pipe frame. Furthermore, the door 2 can be provided with a window 14 at the central part of the door 2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2004-135879 filed Apr. 30, 2004, which is incorporated herein by reference.

What is claimed is:

1. An operator cab for a construction machine, comprising:
   a cab box, which has an internal cab room and an entrance into said cab room;
   a door, which is attached at said entrance such that said entrance is closed when said door is moved forward, and said entrance is opened when said door is moved rearward;
   a bumper, including a first recess and a second recess, wherein said bumper is provided at a rear end of said door;

a slide member, which is connected pivotally to the rear end of said door so as to freely swing horizontally and which slides back and forth along a slide rail, which is provided externally on said cab box, said slide rail extending in a back-and-forth direction;

a closed door stopper, which is provided in front of said slide rail; and an opened door stopper, which is provided in rear of said slide rail;

wherein:

said closed door stopper is configured to fit within the first recess of said bumper when said door shifts forward by a forward movement of said slide member along said slide rail and reaches a closed position where said entrance is closed by said door to keep said rear end of said door at the closed position; and said opened door stopper is configured to fit within the second recess of said bumper when said door shifts rearward and opens by a rearward movement of said slide member along said slide rail to keep said rear end of said door at an opened position.

2. The operator cab set forth in claim 1, wherein:

said construction machine comprises a vehicle body, on which said operator cab is provided to be rotatable.

3. The operator cab set forth in claim 1, wherein:

said slide member is connected pivotally to said bumper so as to freely swing horizontally.

4. The operator cab set forth in claim 1, wherein:

said slide rail is provided approximately at a vertical center of an external surface of said cab box in rear of said entrance, extending in the back-and-forth direction.

5. The operator cab set forth in claim 1, wherein:

a front end of said door is attached to a front side of said entrance of said cab box by a link member, whose one end is connected pivotally to said cab box and whose other end is connected pivotally to the front end of said door, said link member capable of freely swinging horizontally.

6. The operator cab set forth in claim 5, wherein:

said link member comprises an upper link member and a lower link member, which are connected pivotally to an upper front end and a lower front end of said door, respectively, said upper and lower link members capable of freely swinging horizontally.

7. The operator cab set forth in claim 6, wherein:

said lower link member is provided below a floor of said cab box, so that said lower link member never intrudes the cab room of said cab box.

8. The operator cab set forth in claim 1, wherein:

at the front end of said door, a front slide member is provided to slide back and forth with respect to said cab box, so that the front end of said door can slide back and forth with respect to said cab box by said front slide member.

9. The operator cab set forth in claim 1, wherein:

part of a side of said cab box that includes said door in closed condition is flat and extends linearly in the back-and-forth direction in a plan view.

* * * * *